Oct. 18, 1955
A. GASCA ET AL
2,720,879
DIALYSIS APPARATUS
Filed Feb. 15, 1954
7 Sheets-Sheet 1
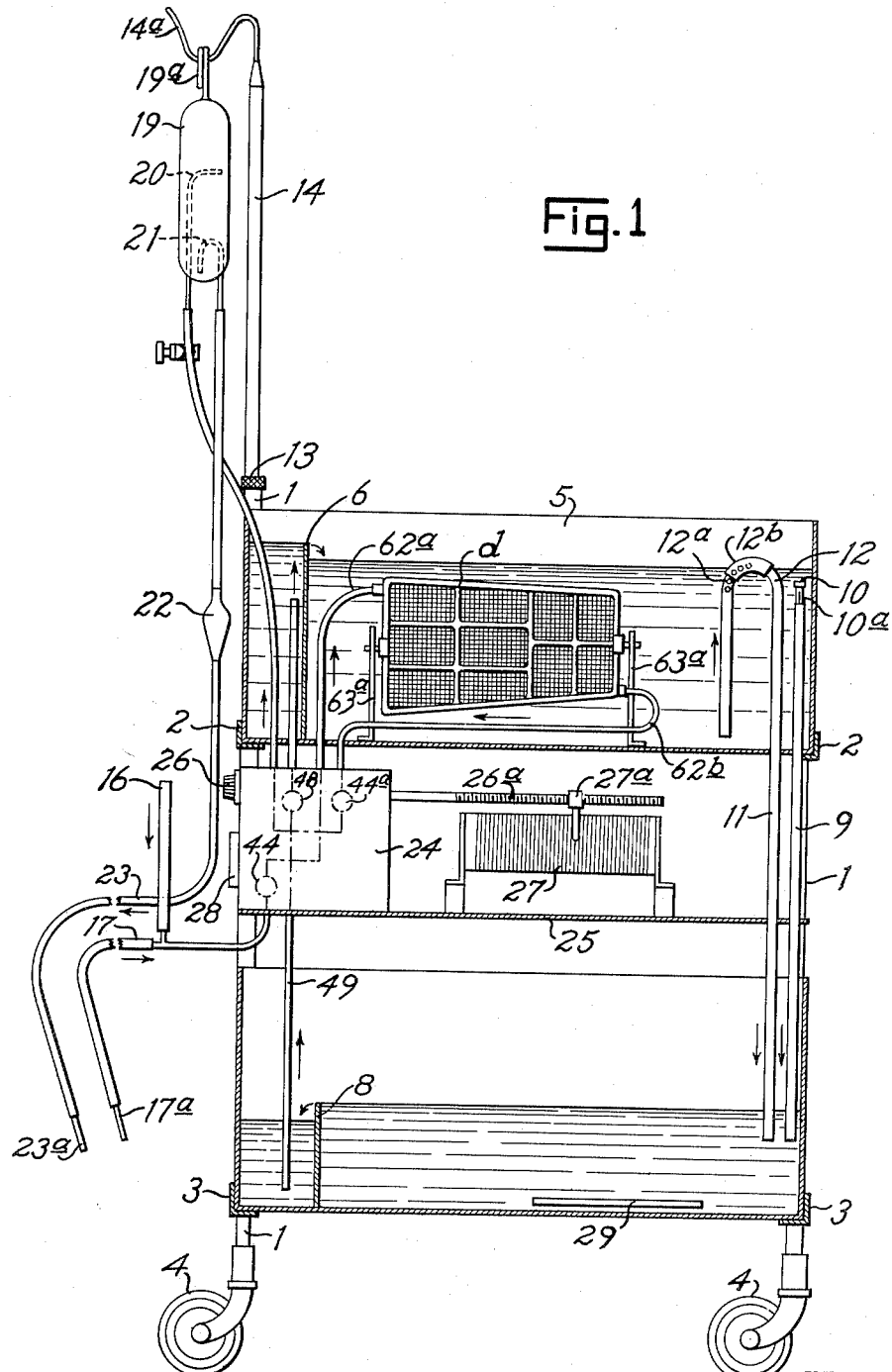
Fig.1
INVENTORS
ALBIN GASCA
JEAN BUGIEL
BY 
ATTORNEY

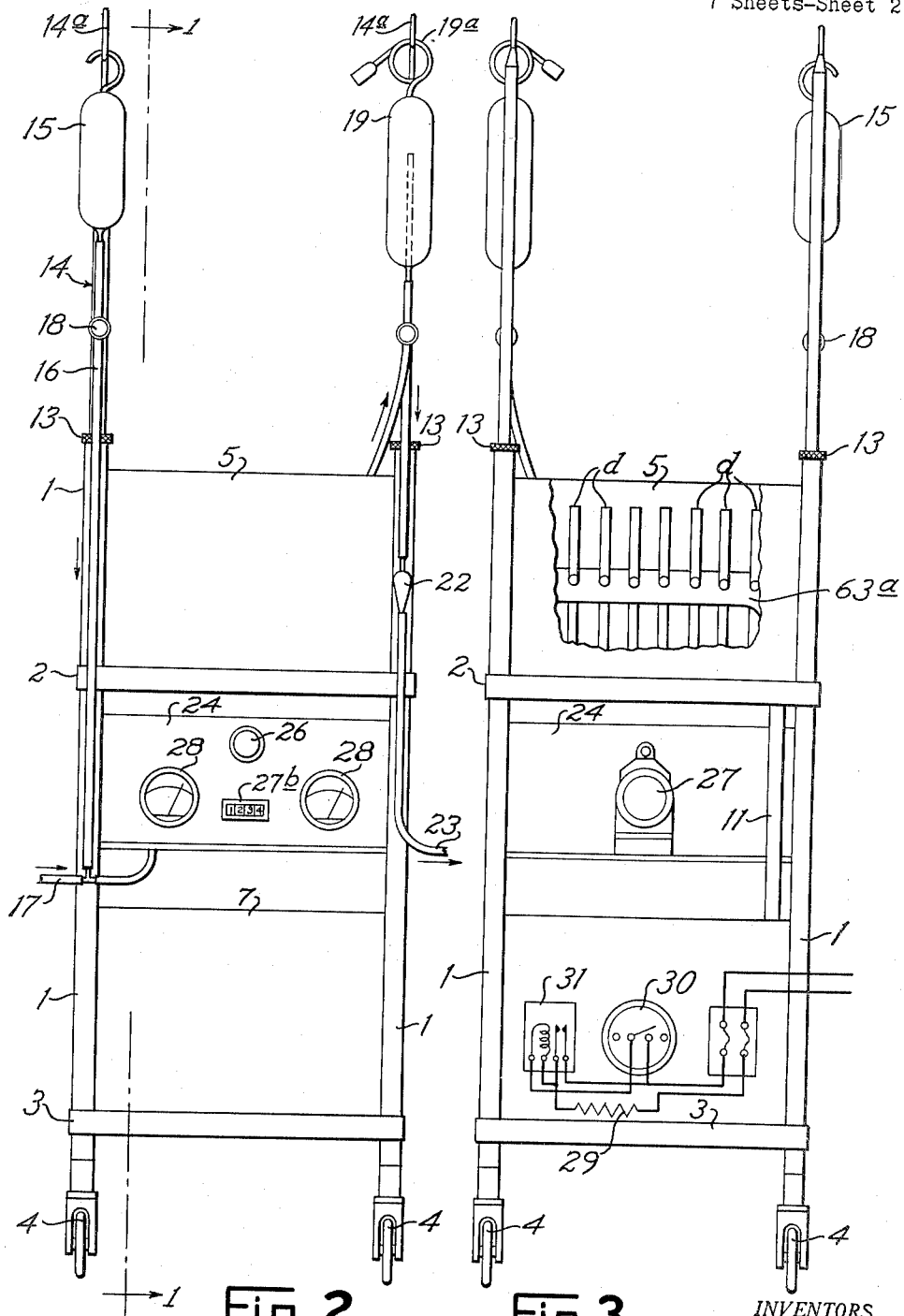
Fig. 2   Fig. 3
INVENTORS
ALBIN GASCA
JEAN BUGIEL
BY
ATTORNEY Oct. 18, 1955    A. GASCA ET AL    2,720,879
DIALYSIS APPARATUS
Filed Feb. 15, 1954    7 Sheets-Sheet 3

INVENTORS
ALBIN GASCA
JEAN BUGIEL
BY
ATTORNEY

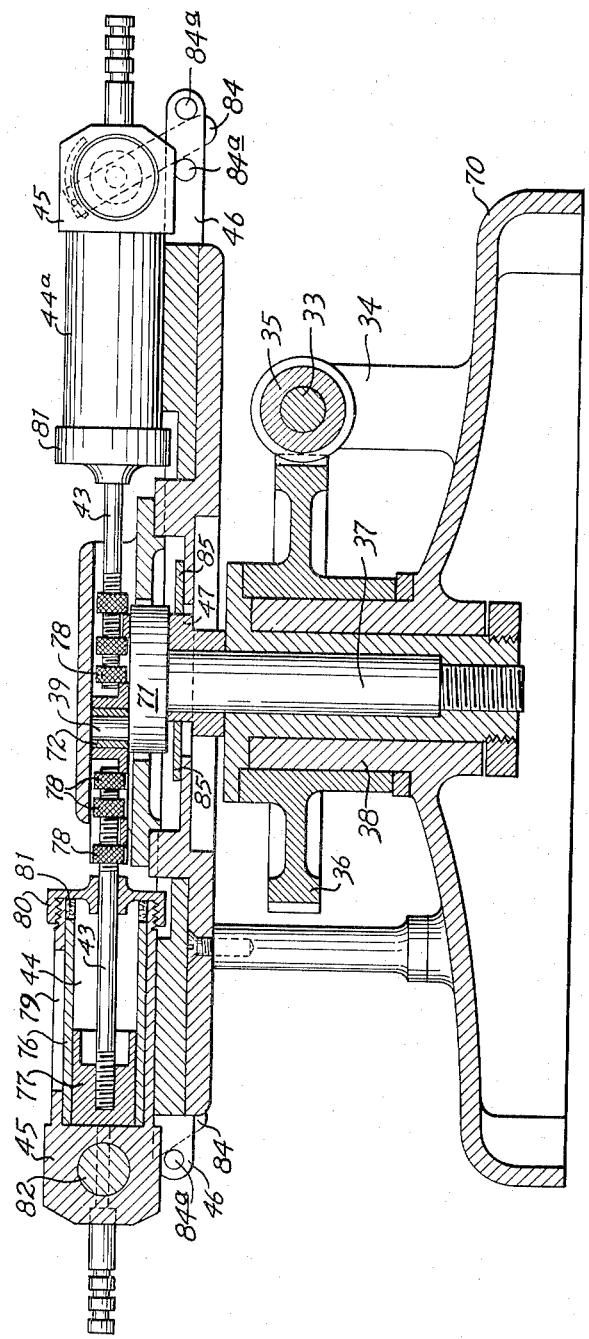

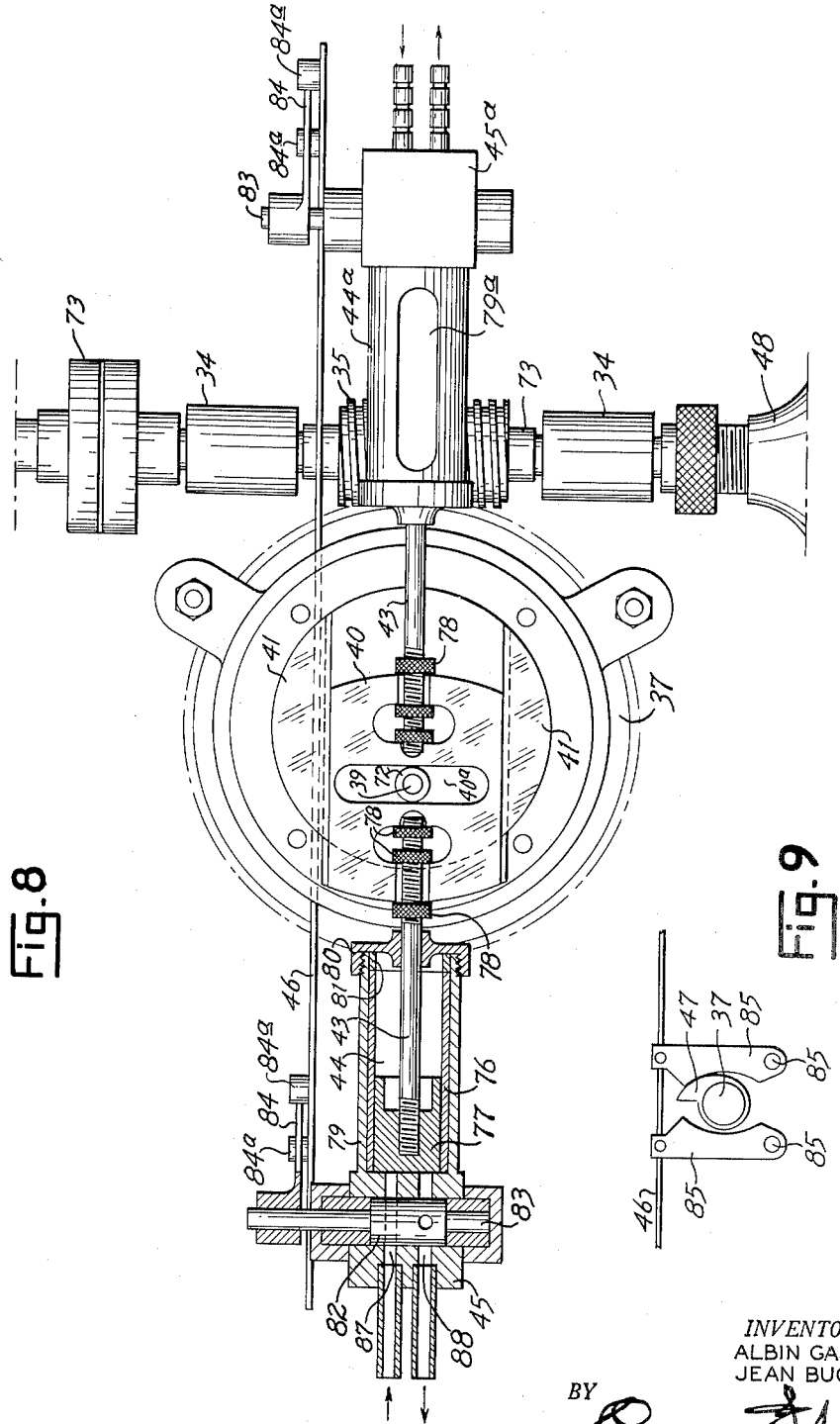

Oct. 18, 1955     A. GASCA ET AL     2,720,879
DIALYSIS APPARATUS
Filed Feb. 15, 1954     7 Sheets-Sheet 6
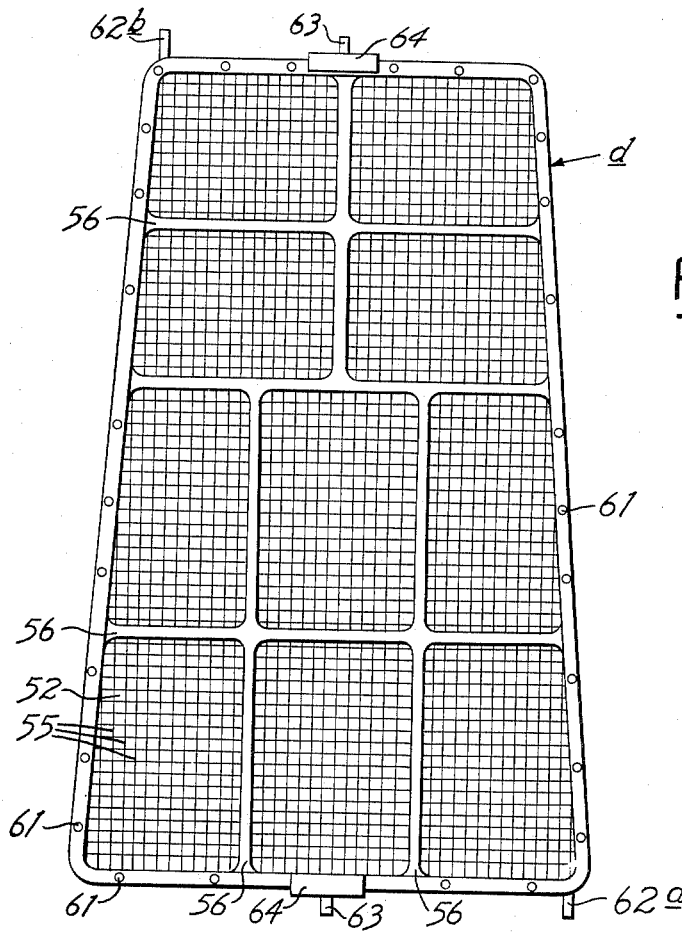
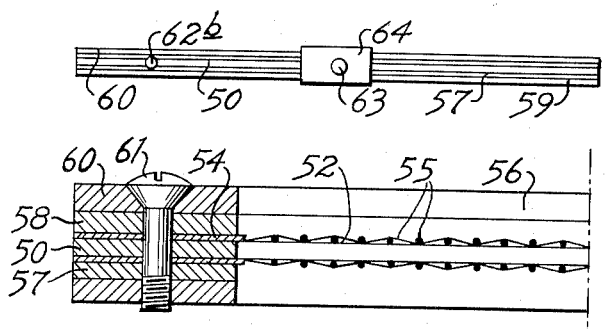
INVENTORS
ALBIN GASCA
JEAN BUGIEL
BY
ATTORNEY

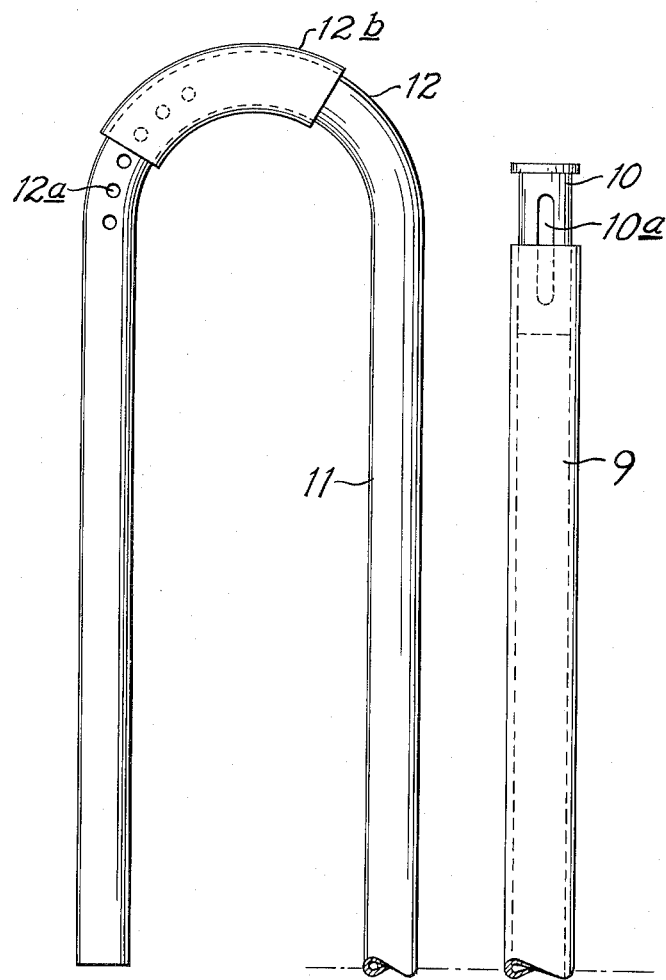

United States Patent Office 2,720,879
Patented Oct. 18, 1955

2,720,879

DIALYSIS APPARATUS

Albin Gasca and Jean Bugiel, Paris, France

Application February 15, 1954, Serial No. 410,292

Claims priority, application France August 1, 1950

15 Claims. (Cl. 128—214)

The present invention relates generally to improvements in dialysis apparatus, and is particularly directed to improvements in such apparatus when employed as so-called "artificial kidneys." The present application is a continuation-in-part of our co-pending application, Serial No. 237,340, filed July 18, 1951, and now abandoned.

The principle of the artificial kidney is well known, and such apparatus includes a dialyser interposed in the blood circulation of the patient and traversed by the blood to cleanse the latter of toxic substances, principally nitrogenous waste products which have accumulated by reason of a defect in the kidneys of the patient. The blood circulates through the dialyser which is formed by a semi-permeable diaphragm separating the blood from a suitable liquid which is isotonic to the blood and of the same osmotic pressure and contains, at the same concentration as the blood, those blood constituents which should remain in the organism. The diaphragm of the dialyser is impermeable to the blood proteins. Thus, the aqueous and saline equilibrium of the blood is preserved and the loss of useful bodies is avoided, while those which diffuse are waste products, such as urea, uric acid, creatine and other diffusible nitrogenous compounds, not chemically identified, which accompany them.

The diaphragms of known dialyser elements are generally formed of a carefully prepared animal membrane, of a sheet of parchmentised paper, of calico impregnated with coagulated albumin or of a sheet of treated porcelain, but these elements all have numerous disadvantages due particularly to the relatively small areas of the semipermeable membranes therein. While the rate of separation of the waste products from the blood is strongly influenced by the extent of the surfaces presented by the membranes between the blood and isotonic liquid within the dialyser elements, the fineness and consequent fragility of the semi-permeable membranes or systems have heretofore limited the areas of such surfaces.

Accordingly, it is an object of the present invention to provide a compact dialyser element for use in an "artificial kidney" and having semi-permeable membranes therein between the blood and isotonic liquid which have relatively large areas to effect rapid separation of the waste products from the blood, with adequate support being provided for the fragile material of the membranes.

Another object is to provide apparatus for use as an "artificial kidney" which includes compact dialyser elements having membranes of relatively large area between the blood and isotonic liquid so that rapid separation of the waste products from the blood can be obtained with only a relatively small quantity of blood contained within the dialyser elements at any time thereby reducing the quantity of blood withdrawn from the patient's body during the operation of the apparatus.

A further object is to provide apparatus of the described character wherein the dialyser elements are immersed in the isotonic liquid which is constantly circulated and maintained at a controlled level so that diffusion of the waste products will continue at a high and uniform rate during the operation of the apparatus.

A still further object is to provide apparatus of the described character which is aseptic to prevent microbic contamination of the blood circulated therethrough, and which maintains the circulated blood in liquid condition to avoid coagulation and returns the blood to the patient at the normal body temperature of 37° centigrade after elimination of the waste products.

Further, it is an object of the present invention to provide apparatus of the described character for use as an artificial kidney which attains relatively great efficiency in removing the waste products from the patient's blood and affords an ease of use which has not been realized with the existing devices provided for the same purpose.

The above, and other objects, features and advantages of the invention are attained in an apparatus for use as an "artificial kidney" which comprises a frame preferably mounted on caster wheels and supporting an upper vessel and a lower vessel for the dialysing liquid. An intermediate platform between the upper and lower vessels carries mechanism including an electric motor driving, by means of suitable speed reducing gear means, a pump causing continuous circulation of the dialysing liquid from the lower vessel to the upper vessel, while the return of this liquid from the upper to the lower vessel is effected in a discontinuous manner by means of a siphon. The electric motor also drives two pumps, which may be of the piston or other suitable type, with one pump drawing the blood from the patient and feeding it into the dialyser in the upper vessel and the other pump returning the blood to the patient.

In accordance with the invention, each dialysing element comprises a frame forming a spacer and having an osmotic diaphragm on each face thereof which is supported by a network of wires, formed of metal or of other suitable material, secured to frames of small thickness fitted to the first mentioned frame and engaging against the outside surface of the osmotic diaphragms to strengthen and support the latter. This assembly is completed by two outer frames provided with bars which serve both to support the network from place to place and to clamp together the assembled frames.

Further, in accordance with the invention the two superposed tanks or vessels for containing the isotonic dialyzing liquid are interconnected by an overflow pipe depending from the upper one of the tanks into the lower tank. The upper end of the overflow pipe is adjustably restricted to permit a rate of flow therethrough which is less than the rate at which the dialyzing liquid is pumped from, and the siphon is formed by a pipe extending into the lower tank and having a downwardly bent upper end within the upper tank formed with a series of spaced apart openings to be selectively obstructed by a sleeve which is movable along the related portion of the siphon pipe. The openings in the siphon pipe are dimensioned so that the combined rates of flow through such openings and the overflow pipe are greater than the rate at which the dialyzing liquid is pumped into the upper tank. Thus, a continuous circulation of dialyzing liquid occurs through the overflow pipe, and so long as a flow occurs through the siphon pipe, the level of such liquid in the upper tank will gradually decline. However, when the level of liquid in the upper tank recedes to the uncovered opening of the siphon pipe, the siphon is broken to interrupt the flow through the siphon pipe so that the liquid then rises within the upper tank up to the top of the siphon pipe to reprime the latter. Thus, the dialyzing liquid is continuously circulated and the level thereof in the upper tank is maintained between the limits defined by the top of the siphon pipe and the uppermost of the uncovered openings in the siphon pipe. In order that the present invention may be fully understood, an illustrative embodiment thereof is hereinafter described in detail, merely by way of example, and shown in the accompanying drawings, forming a part hereof and wherein:

Fig. 1 is a vertical sectional view of apparatus embodying the present invention, taken along the line 1—1 of Fig. 2;

Fig. 2 is a front elevational view of the apparatus of Fig. 1;

Fig. 3 is a rear elevational view of the apparatus of Fig. 1;

Fig. 7 is a sectional view of the pumping arrangement on an enlarged scale and showing the details of construction thereof, with said view being taken along the line 7—7 of Fig. 4;

Fig. 8 is a fragmentary plan view, partly broken away and in section, of the pumping arrangement structure illustrated in Fig. 7;

Fig. 9 is a detail view of a valve actuating assembly included in the structure of Figs. 7 and 8;

Fig. 10 is a plan view of a dialyzing element embodying the invention;

Fig. 11 is a side elevational view of the element of Fig. 10;

Fig. 12 is a fragmentary transverse sectional view of the element shown in Figs. 10 and 11, but on an enlarged scale; and Fig. 13 is an enlarged, detail view of the arrangement of overflow and siphon pipes included in the apparatus of Figs. 1, 2 and 3.

Figure 4:
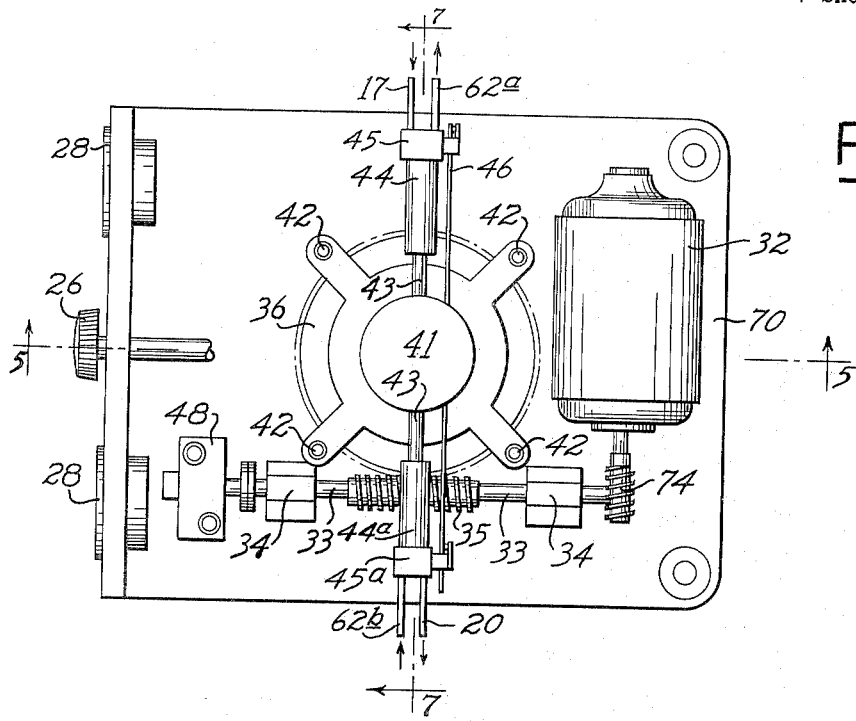
Fig. 4 is a schematic representation of a pumping arrangement included in the apparatus of Figs. 1, 2 and 3, as viewed from above.

Referring to Fig. 1, it will be seen that the apparatus embodying this invention includes a carriage or frame formed by four vertical tubes or standards 1, connected by two pairs of horizontal angle members 2 and 3, with the frame being supported by four caster wheels 4 placed at the lower ends of the tubes 1.

The lower angle members 3 support a lower vessel or tank 7 which is also divided into two unequal compartments by a vertical partition 8.

An overflow pipe 9 extends downwardly from the large compartment of tank 5 into the large compartment of lower tank 7 and the upper end of the overflow pipe is restricted, preferably in an adjustable manner. Such adjustable restriction of the opening at the upper end of pipe 9 may be effected, as in the illustrated embodiment (Fig. 13), by a hollow stopper 10 which telescopes adjustably into the upper end of pipe 9 and is formed with an elongated opening or slot 10a extending axially to be more or less exposed above the upper edge of the overflow pipe depending upon the axial position of stopper 10 with respect to that pipe. Thus, the adjustable restriction at the upper end of pipe 9 serves to control the rate of flow through the overflow pipe from the large compartment of upper tank 5 into the large compartment of lower tank 7.

A siphon pipe 11 also extends downwardly from the large compartment of upper tank 5 into the large compartment of lower tank 7 and at its upper end is bent downwardly, as at 12, within the upper tank. One of the arms of the upper bent portion 12 of the siphon pipe 11 is formed with a series of longitudinally spaced openings 12a and a flexible sleeve 12b, for example, formed of rubber, is slidable longitudinally on the upper portion of the siphon pipe to selectively cover the openings 12a. Thus, when the liquid in the large compartment of upper tank 5 rises to a level above the uppermost point on the bent portion 12 of the siphon pipe, the latter is primed and the liquid flows through siphon pipe 11 into the large compartment of lower tank 7. However, when the level of the liquid in the large compartment of upper tank 5 falls below the uppermost one of the openings 12a exposed by sleeve 12b, air enters the siphon pipe 11 and interrupts the siphoning flow from tank 5 to tank 7. It is apparent that the adjustable sleeve 12b permits the controlled variation of the liquid level at which the siphoning through pipe 11 is to be interrupted. Preferably, the upper end of pipe 9 is disposed below the lowermost opening 12a of the siphon pipe so that the flow through pipe 9 is continuous throughout the range of levels obtainable by adjustment of sleeve 12b.

One or more dialysis elements are disposed within the large compartment of upper tank 5 (Figs. 1 and 3), with each of the dialysis elements being generally identified by the reference d and preferably constructed in the manner hereinafter described in detail.

The tubes or hollow standards 1 at the front of the apparatus frame (Figs. 1 and 2) have extension rods 14 projecting slidably from the upper ends thereof and terminating in hooked portions 14a. Suitable, conventional retaining devices (not shown) are provided for adjustably securing the rods 14 against movement relative to the respective standards 1, with such retaining devices being actuated by knurled nuts 13.

The hook 14a of one of the rods 14 supports a flask 15 containing a liquid, for example, an anti-coagulant, serum or the like, which it is desired to include in the blood circulation. This flask is connected by a flexible pipe or tube, (Fig. 2) with a tube 17 taking the blood from the patient to the apparatus. The feed of liquid from flask 15 is regulated by a cock or valve 18 and by its admission pressure which is a function of the height at which the flask 15 is suspended.

The other hook 14a supports a flask 19 (Figs. 1 and 2) through which passes all the blood circulating through the apparatus. The purpose of the flask 19 is to equalize the pressure of the blood being returned to the patient with the pressure of the blood in the patient. Flask 19 contains two pipes 20 and 21 (Fig. 1). Pipe 20 supplies the returning blood to the flask and it opens in the upper part of the latter. Pipe 21 is curved downwardly so as to form a siphon and it feeds the blood from the flask 19 to a fixed or drop-feed apparatus 22 of conventional construction from which it is returned to the patient by the flexible pipe 23. Thus any impurities carried by the blood are deposited in the base of the flask and gas bubbles leaving the blood are evacuated by a vent pipe 19a, opening to the atmosphere from the upper part of the flask and this vent pipe is preferably coiled to form the means for hanging the flask 19 on the supporting hook 14a as in the illustrated embodiment. The return pressure of the blood to the patient is a function of the height relative to the patient at which the flask 19 is suspended.

In order to provide for diverting blood from the patient through the apparatus embodying the present invention, the free ends of flexible pipes 17 and 23 are provided with conventional hollow needles 17a and 23a (Fig. 1) which can be inserted in the patient's circulatory system.

Figure 5:
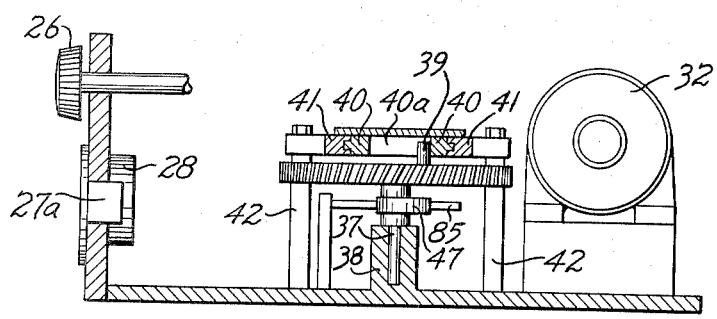
Fig. 5 is a schematic sectional view taken along the line 5—5 of Fig. 4.
Figure 6:
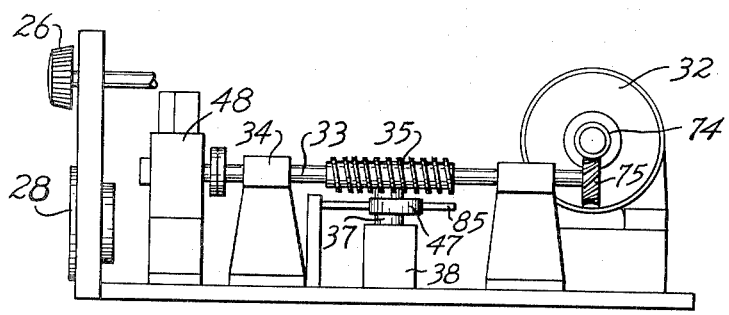
Fig. 6 is a schematic side elevational view of the arrangement of Fig. 4.

The "artificial kidney" apparatus embodying this invention further includes pumping mechanism, generally identified by the reference numeral 24 (Figs. 1, 2 and 3), which is mounted upon a platform or table 25 located between the tanks 5 and 7. The pumping mechanism is hereinafter described in detail, but for the present it is sufficient to state that it serves to circulate the blood and dialysing liquid through the apparatus and is driven by a variable speed motor 32 (Figs. 4, 5 and 6). Devices for controlling and supervising the operation of the apparatus are shown schematically in Figs. 1, 2 and 3 of the drawings and include a knurled knob 26 for rotating a threaded shaft 26a which moves a contact 27a along a rheostat 27 interposed in the energising circuit (not shown) of the motor 32 to control the speed of the latter.

Further, a counter 27b (Fig. 2) of conventional construction serves to indicate the quantity of blood that has been circulated through the apparatus, and pressure gauges 28 may also be provided for indicating the pressures in the various circuits of the apparatus.

The temperature of the dialysing liquid is held at the body temperature of the patient by an electric heater of conventional form, indicated schematically at 29 (Fig. 1), within the lower vessel 7 and controlled by a thermostat 30 operating a relay 31 (Fig. 3) with a suitable temperature indicator being preferably provided. The heater 29, thermostat 30 and relay 31 are connected in a conventional manner so that the heater is intermittently energized to maintain the temperature of the dialysing liquid at the desired level. For example, as shown in Fig. 3, the contacts of relay 31 are arranged in series with the heating element 29 in the electrical circuit for energizing the latter, and the thermostat 30 responds to the temperature of the dialysing liquid in the lower tank 7 to intermittently energize the coil of relay 31 controlling the closing and opening of the contacts of the latter.

Referring to Figs. 4 to 8, inclusive, it will be seen that the electric motor 32, by means of a suitable reduction gearing device drives a shaft 33 supported in bearings 34. The shaft 33 carries a worm 35 which drives a worm wheel 36 on a shaft 37 rotating in a vertical bearing 38. The shaft 37 supports an eccentric pin 39 which rotates in an elongated slot 40a in a part 40 causing the latter to move in linear guideways 41 disposed at right angles to the slot in part 40 and supported by columns 42. Thus the rotation of shaft 37 is converted into the linear reciprocation of part 40. The part 40 actuates rods 43 extending from the pistons of pumps 44 and 44a. The pump 44 draws the blood from the patient through pipe 17 and propels the blood into the dialyser elements d mounted in the upper tank 5, while the other pump 44a withdraws the blood from the dialyser elements and pumps it through pipe 20 into the flask 19 for return to the patient.

The pumps 44 and 44a, being piston-type pumps, have the intake and delivery of blood regulated by suitable valves 45 and 45a, with the actuation of such valves being positively effected by a rod 46 under the control of a cam 47, secured on shaft 37 for rotation with the latter.

The shaft 33 is also coupled to a pump 48 to drive the latter, and the pump 48 is interposed in a pipe 49 (Fig. 1) extending from the small compartment of lower tank 7 to the small compartment of upper tank 5 so that the pump 48 serves to lift the dialysing liquid from the lower tank to the upper tank.

Figs. 7, 8 and 9 illustrate the structural details of the pumping mechanism in a preferred embodiment of the invention, and it will there be seen that the pumping mechanism is mounted on a base 70 defining the vertical bearing 38 at the center to rotatably support the shaft 37. Preferably, shaft 37, at its upper end is formed with an integral disc 71 from which the eccentric pin 39 extends (Fig. 7), and a roller or bearing 72 is provided on pin 39 to avoid wear during the movement thereof along the slot 40a of part 40. The worm gear 36 is fixed against rotation relative to shaft 37 and is driven by the worm 35 on shaft 33, so that the shaft 37, disc 71 and cam 47 are rotated as a unit. Preferably, a clutch 73 (Fig. 8) is interposed in shaft 33, and the transmission between motor 32 and shaft 33 is effected by a worm 74 on the motor shaft meshing with a worm gear 75 on the end of shaft 33 (Fig. 6).

Each of the blood pumps 44 and 44a (Figs. 7 and 8) includes a hollow cylinder 76 formed of a transparent material, such as glass, and having a piston 77 reciprocatable therein. The piston rods 43 extending from pistons 77 are threaded at their free ends and adjustably secured to the part 40 by nuts 78 on the threaded portions of the piston rods so that the related pistons 77 can be positionally adjusted with respect to the part 40. The glass cylinder 76 of each pump is disposed in a metal sleeve 79 formed with a longitudinal slot 79a through which the exposed interior of cylinder 76 can be viewed, and the cylinder 76 is held within the related sleeve 79 by a head 80 threaded on the open end of the sleeve with a suitable packing 81 being interposed between head 80 and the adjacent end of cylinder 76.

The housings or bodies of valves 45 and 45a are integral with the sleeves 79 of the related pumps and each valve body is formed with inlet and outlet passages 87 and 88, respectively, extending in parallel relation and opening into the adjacent end of the cylinder 76. A bore extends through the valve body and is traversed by the related passages 87 and 88, and a valve cock 82 is oscillatable in the bore of the valve body. The valve cock 82 is formed with angularly displaced passages therethrough adapted to be selectively registered with the inlet and outlet passages 87 and 88 to alternately close and open the latter as the valve cock is oscillated.

In order to effect oscillation of the valve cocks, each of the latter is mounted on an axle 83 extending out of the related valve body and having a lever 84 extending radially therefrom to engage between spaced pins 84a extending from the adjacent end portion of the actuating rod 46 so that, as the latter is reciprocated, the levers 84 are angularly displaced to similarly displace the associated valve cocks 82.

As seen in Fig. 9, the rod 46 is preferably pivotally connected to two cam follower levers 85 disposed at opposite sides of shaft 37 at the level of cam 47 and mounted on fixed pivots 86 for swinging in a horizontal plane so that, as cam 47 rotates with shaft 37, the cam alternately contacts the levers 85 to reciprocate valve actuating rod 46.

Referring to Figs. 10, 11 and 12, it will be seen that each of the dialysis elements d comprises a frame 50 having diffusion or semi-permeable diaphragms 52 disposed against the opposite faces thereof. Relatively thin frames 53 and 54 are disposed against the outer sides of diaphragms 52 and each of these thin frames supports a network 55 of wires which engages the adjacent diaphragm to support and strengthen the latter. Additional stiffening frames 57 and 58 are disposed against the outer sides of the network supporting frames 53 and 54, respectively, and each of the frames 57 and 58 includes laterally and longitudinally extending stiffening bars 56 which provide additional rigidity to the assembly and support for the adjacent wire networks. The frames 50, 53, 54, 57 and 58 and the diaphragms 52 are clamped together by clamping frames 59 and 60 disposed against the outer sides of the frames 57 and 58, respectively, and held together by clamping screws 61 (Fig. 12) at locations around the periphery of the dialyser element.

Although a particular preferred arrangement of the frame elements has been illustrated and described in detail, it is to be understood that such structure may be varied, for example, the frame parts 53, 57 and 59 may be formed as a single element and the frame parts 54, 58 and 60 may similarly be formed as a single element. Further, while the diaphragms 52 are preferably formed of sheets of "cellophane," that is, viscose solidified in thin sheets, and the networks 55 can conveniently be formed of nylon threads, other suitable materials can be used for these purposes.

The inlet and outlet of blood to the interior of the dialyser element is effected by pipes 62a and 62b, respectively, which extend through frame 50 at the opposite ends of the element to open into the space between the diaphragms 52, and as shown in Figs. 1 and 4, the pipes 62a and 62b are respectively connected to the outlet of pump 44 and to the inlet of pump 44a.

Pivot pins 63 extend from carriers 64 suitably secured to the opposite ends of the element d, with the pins 63 being in axial alignment so that they can engage in suitable notches formed in the upper edges of spaced support frames 63a (Figs. 1 and 3) to rockably suspend the dialyser element within the upper tank 5. As seen in Fig. 3, a battery of dialyser elements d can be supported in the above manner within the large compartment of upper tank, and in that event the several inlet pipes 62a and outlet pipes 62b branch-off from common inlet and outlet manifolds (not shown) leading from the pumps 44 and 44a.

The apparatus described above and embodying the present invention operates as follows:

The hollow needles 17a and 23a at the ends of flexible pipes 17 and 23 are inserted in the venous system of the patient, for example, one in each of the patient's arms, and the pump 44 draws the blood through pipe 17 and pipe 62a into each of the dialyser elements d, while the pump 44a withdraws the blood from each of elements d through pipes 62b and then through pipe 20 into the flask 19. The blood collects at the bottom of flask 19 and is withdrawn from the latter by the siphon pipe 21, while the return flow of blood to the patient through pipe 23 is regulated by the drop-feed device 22 fed from the siphon pipe 21.

Since the dialyser element or elements d are immersed in the dialysis liquid within the large compartment of upper tank 5, the waste products in the blood drawn from the patient diffuse through the semi-permeable diaphragms 52 of the elements d into the dialysis liquid during the passage of the blood through the dialyser elements so that such waste products are eliminated from the blood returned to the patient.

The dialysis liquid is continuously circulated and maintained at or near the body temperature of the patient by the electric heater 29 and its associated circuit thereby to prevent coagulation of the blood and any variation in the patient's body temperature by reason of the treatment of the blood. Further, the dialysis liquid is continuously circulated between the tanks 5 and 7 to avoid the accumulation of dialysis liquid saturated with the waste products around the dialysis elements. Such circulation is effected by the pump 48 which raises the dialysis liquid from the small compartment of lower tank 7 into the small compartment of upper tank 5 through the pipe 49. The liquid is decanted from the small compartment of upper tank 5 into the large compartment of the latter containing the dialyser elements. The stopper 10 of the overflow pipe 9 is adjusted so that the rate of flow through the opening 10a is less than the rate at which the pump 48 discharges the liquid into the upper tank 5. Thus, the level of dialysis liquid in the large compartment of tank 5 will rise until it reaches above the highest point of the bent portion 12 of siphon pipe 11 and primes the latter, after which the liquid will also flow out of the upper tank through siphon pipe 11. However, the combined rates of flow through pipes 9 and 11 are greater than the rate at which pump 48 pumps the liquid into the upper tank so that the liquid level recedes, during flow through both pipes 9 and 11, until the level reaches down to the uppermost uncovered opening 12a to break the siphon and interrupt the flow through pipe 11. Thus, the dialysis liquid flows continuously through pipe 9, while the intermittent flow through siphon pipe 11 serves to maintain the level of the liquid between predetermined limits to ensure complete immersion of the elements d.

While a particular embodiment of the invention has been described in detail and illustrated in the accompanying drawings, it is to be understood that the invention is not limited thereto, and that various changes and modifications may be effected therein without departing from the scope or spirit of the invention as defined in the appended claims.

What is claimed is:

1. In dialysis apparatus adapted to be interposed in the blood circulation of a patient to cleanse the blood of toxic substances, particularly nitrogenous waste products, which have accumulated by reason of a defect in the kidneys of the patient; the combination of two superposed tanks, communicating pipe between said tanks, means causing a dialysis liquid to circulate in a closed circuit through both of said tanks, at least one dialyser element mounted in the upper one of said tanks, means for drawing blood from a patient and for passing the blood through said element, and means for returning the blood from said element to the blood stream of the patient.

2. In dialysis apparatus adapted to be interposed in the blood circulation of a patient to cleanse the blood of toxic substances, particularly nitrogenous waste products, which have accumulated by reason of a defect in the kidneys of the patient; the combination according to claim 1, wherein each dialyser element includes a first frame of substantial thickness, semi-permeable diaphragms on the opposite faces of said first frame to define a space therebetween through which the patient's blood is circulated, networks of elongated, thin supporting members disposed against the outside surfaces of said diaphragms to support the latter, and means holding said networks against the related diaphragms.

3. In dialysis apparatus adapted to be interposed in the blood circulation of a patient to cleanse the blood of toxic substances, particularly nitrogenous waste products, which have accumulated by reason of a defect in the kidneys of the patient; the combination according to claim 2, wherein said means holding the networks against the related diaphragms includes auxiliary frame means coextensive with said first frame and carrying said networks, reinforcing members extending across said auxiliary frame means and stiffening said networks, clamping frames arranged at the opposite sides of the assembled first frame and auxiliary frame means, and clamping screws urging said clamping frames together with said first frame and auxiliary frame means therebetween.

4. In dialysis apparatus adapted to be interposed in the blood circulation of a patient to cleanse the blood of toxic substances, particularly nitrogenous waste products, which have accumulated by reason of a defect in the kidneys of the patient; the combination according to claim 2, including a plurality of said dialyser elements disposed in said upper tank.

5. In dialysis apparatus adapted to be interposed in the blood circulation of a patient to cleanse the blood of toxic substances, particularly nitrogenous waste products, which have accumulated by reason of a defect in the kidneys of the patient; the combination according to claim 1, further including a frame on casters supporting said tanks and having vertically adjustable rods extending therefrom; and wherein said means for returning blood from said element to the patient includes a flask suspended from one of said vertically adjustable rods, pipe means extending from said element into said flask and having a pump interposed therein to convey blood from said element to said flask, a siphon pipe for withdrawing blood from said flask, a drop-feed device connected to said siphon pipe to receive blood from the latter at a pressure depending upon the relative height of said flask, and a flexible return pipe extending from said drop-feed device and terminating in a hollow needle for insertion in the venous system of the patient to return the blood drop-by-drop to the patient.

6. In dialysis apparatus adapted to be interposed in the blood circulation of a patient to cleanse the blood of toxic substances, particularly nitrogenous waste products, which have accumulated by reason of a defect in the kidneys of the patient; the combination of two superposed tanks for containing a dialysis liquid, means continuously supplying dialysis liquid from the lower one of said tanks to the upper one of said tanks, means continuously discharging dialysis liquid from said upper tank into said lower tank at a rate smaller than the rate at which the liquid is supplied to said upper tank, intermittently operative additional means for discharging dialysis liquid from said upper tank into said lower tank to maintain the level of liquid in said upper tank approximately at a predetermined level, at least one dialyser element suspended in said upper tank below said predetermined level, means for drawing blood from a patient and for passing the blood through said element, and means for returning the blood from said element to the blood stream of the patient.

7. In dialysis apparatus adapted to be interposed in the blood circulation of a patient to cleanse the blood of toxic substances, particularly nitrogenous waste products, which have accumulated by reason of a defect in the kidneys of the patient; the combination according to claim 6, further including vertical partitions in both of said tanks dividing each of the latter into a relatively large compartment and a relatively small compartment, and wherein said means continuously supplying dialysis liquid from said lower tank to said upper tank communicates with said small compartments of said tanks and said means continuously and intermittently discharging liquid from said upper tank extend between said large compartments of said upper and lower tanks, with said dialysis element being disposed in said large compartment of the upper tank so that the dialysis liquid acting on the blood passing through said element is decanted a first time in passing from the large compartment to the small compartment of said lower tank over the related partitions and is decanted a second time in flowing from the small compartment to the large compartment of the upper tank over the partition in the latter.

8. In dialysis apparatus adapted to be interposed in the blood circulation of a patient to cleanse the blood of toxic substances, particularly nitrogenous waste products, which have accumulated by reason of a defect in the kidneys of the patient; the combination according to claim 7 including a plurality of said dialysis elements disposed in said large compartment of said upper tank.

9. In dialysis apparatus adapted to be interposed in the blood circulation of a patient to cleanse the blood of toxic substances, particularly nitrogenous waste products, which have accumulated by reason of a defect in the kidneys of the patient; the combination according to claim 8, further including means rockably mounting each of said dialysis elements in said large compartment of the upper tank to permit said elements to rock within the dialysis liquid in response to movement of the latter.

10. In dialysis apparatus adapted to be interposed in the blood circulation of a patient to cleanse the blood of toxic substances, particularly nitrogenous waste products, which have accumulated by reason of a defect in the kidneys of the patient; the combination according to claim 7, wherein said means continuously discharging dialysis liquid from said upper tank into said lower tank includes an overflow pipe depending from said large compartment of the upper tank into said large compartment of the lower tank, and a stopper adjustably telescoping into the upper end of said overflow pipe within said upper tank and having an elongated opening in the side thereof for varying exposure above the upper end of said overflow pipe as said stopper is axially adjusted relative to the overflow pipe thereby to provide for varying the restriction to flow through said overflow pipe.

11. In dialysis apparatus adapted to be interposed in the blood circulation of a patient to cleanse the blood of toxic substances, particularly nitrogenous waste products, which have accumulated by reason of a defect in the kidneys of the patient; the combination according to claim 7, wherein said intermittently operative additional means for discharging dialysis liquid from said upper tank includes a siphon pipe extending from said large compartment of the upper tank into said large compartment of the lower tank and having a downwardly bent upper end portion within said upper tank, said downwardly bent upper end portion having a series of spaced apart openings along the length thereof, and a sleeve sliding on said downwardly bent portion of the siphon pipe to selectively close said openings so that said siphon pipe is unprimed when the level of liquid in said large compartment of the upper tank falls below the uppermost uncovered one of said openings to interrupt the flow through said siphon pipe.

12. In dialysis apparatus adapted to be interposed in the blood circulation of a patient to cleanse the blood of toxic substances, particularly nitrogenous waste products, which have accumulated by reason of a defect in the kidneys of the patient; the combination according to claim 11, wherein said means continuously discharging dialysis liquid from said upper tank into said lower tank includes an overflow pipe depending from said large compartment of the upper tank, and a stopper adjustably telescoping into the upper end of said overflow pipe within said upper tank and having an elongated opening in the side thereof for varying exposure above the upper end of said overflow pipe as said stopper is axially adjusted relative to the overflow pipe thereby to provide for varying the restriction to flow through said overflow pipe.

13. In a dialysis apparatus adapted to be interposed in the blood circulation of a patient to cleanse the blood of toxic substances, particularly nitrogenous waste products, which have accumulated by reason of a defect in the kidneys of the patient; the combination of two superposed tanks for containing a dialysis liquid, an overflow pipe depending from the upper one of said tanks into the lower one of said tanks; means at the upper end of said overflow pipe for adjustably restricting the flow through the latter, a siphon pipe extending from said upper tank into said lower tank and having a downwardly bent end portion within said upper tank formed with a series of openings spaced therealong, means for selectively closing said spaced openings so that said siphon pipe is unprimed when the level of liquid in said upper tank falls below the lowermost uncovered opening of said siphon pipe to interrupt the flow through the latter, pipe means extending from said lower tank to said upper tank, pump means interposed in said pipe means to pump dialysis liquid from said lower tank to said upper tank at a rate exceeding the rate of flow through said overflow pipe and less than the combined rates of flow through said overflow and siphon pipes so that said overflow pipe maintains a continuous circulation of the liquid and said siphon pipe maintains the level of the liquid in said upper tank approximately at a predetermined level, at least one dialysis element mounted within said upper tank below said predetermined level, and means for circulating blood from a patient through said element and back to the blood stream of the patient.

14. In a dialysis apparatus adapted to be interposed in the blood circulation of a patient to cleanse the blood of toxic substances, particularly nitrogenous waste products, which have accumulated by reason of a defect in the kidneys of the patient; the combination according to claim 13, further comprising electrical heating means disposed in said lower tank, and thermostatic means controlling the energization of said heating means so that the latter maintains the temperature of the dialysis liquid at a predetermined temperature.

15. In dialysis apparatus adapted to be interposed in the blood circulation of a patient to cleanse the blood of toxic substances, particularly nitrogenous waste products, which have accumulated by reason of a defect in the kidneys of the patient; the combination according to claim 13, wherein said means for selectively closing said spaced openings includes a sleeve slidable on said downwardly bent portion of the siphon pipe.

No references cited.